United States Patent
Wohlford et al.

(10) Patent No.: US 6,688,193 B2
(45) Date of Patent: Feb. 10, 2004

(54) ROTARY BLADE CUTTERBAR INCLUDING PLASTIC IDLER GEAR SUPPORT HUB WITH METAL INSERT

(75) Inventors: William Paul Wohlford, Bettendorf, IA (US); Gary Raymond Dustin, Albia, IA (US); Michael Joseph Verhulst, Ottuma, IA (US); Michael James Mellin, Ottumwa, IA (US)

(73) Assignee: Deere & Company, Moline, IL (US)

( * ) Notice: Subject to any disclaimer, the term of this patent is extended or adjusted under 35 U.S.C. 154(b) by 192 days.

(21) Appl. No.: 10/056,696

(22) Filed: Jan. 24, 2002

(65) Prior Publication Data

US 2003/0136218 A1 Jul. 24, 2003

(51) Int. Cl.$^7$ ............................... F16H 57/02
(52) U.S. Cl. ............................ 74/606 R; 56/6
(58) Field of Search ............... 74/606 R, DIG. 10; 56/6, 10.3, 13.6

(56) References Cited

U.S. PATENT DOCUMENTS

| | | | |
|---|---|---|---|
| 5,274,987 A | * | 1/1994 | Wiener ..................... 56/14.8 |
| 5,715,662 A | | 2/1998 | Walters |
| 5,718,105 A | * | 2/1998 | Irikura et al. ............... 56/11.4 |

* cited by examiner

*Primary Examiner*—David Fenstermacher

(57) ABSTRACT

A rotary cutterbar includes a gear case containing a series-parallel set of gears including idler gears and pinion gears for driving the cutting discs of the cutter units. The gear case includes top and bottom walls and the idler gears are each received on a hub including an enlarged upper end located in a hole provided in the top wall and a threaded lower end screwed into a hole provided in the bottom wall. The hubs each have a plastic outer shell encasing a metal insert extending axially within the shell, with the shell forming the sole contact between each hub and the gear case whereby vibrations and shock loads respectively due to gear tooth contact and a cutter knife contacting an obstacle are absorbed by the shell to lessen the transmission of noise and the magnitude of the impact force. O-ring grooves are provided in the plastic shell and receive o-rings for preventing leakage from the gear case through the holes in the top and bottom walls. The top end of the metal insert is provided with an internal socket and an external hexagonal surface, with the socket being provided for receiving a complementary shaped wrench which is used for installing the hub by screwing it into the threaded hole and with the exterior surface providing a non-rotational surface to assist in maintaining good physical retention of the insert within the plastic shell.

16 Claims, 4 Drawing Sheets

US 6,688,193 B2

ROTARY BLADE CUTTERBAR INCLUDING PLASTIC IDLER GEAR SUPPORT HUB WITH METAL INSERT

BACKGROUND OF THE INVENTION

The present invention relates to rotary blade cutterbars and more particularly relates to support hubs for the idler gears of such cutterbars.

Rotary blade cutterbars have a plurality of side-by-side cutting units with the cutter discs of some cutterbars having gear pinion gears driven through a gear train comprising a plurality of meshed idler gears. These idler gears are meshed with each other so as to transmit power from one end to the other of the cutterbar and are selectively meshed with the pinion gears of the cutting units for determining the direction of rotation of the cutting units. The support hubs for the idler gears of one known cutterbar of this type are fabricated from steel and include o-ring grooves in which o-rings are placed to seal the interfaces of the hub with the gear box. These hubs experience very high shear loads at times when the cutting blades of the cutter units impact foreign objects in the field. Also, the current cutterbar transmits gear vibrations to the implement through its rigid structure and is heavy. U.S. Pat. No. 5,715,662, granted to Walters on Feb. 10, 1998 discloses a cutterbar of this type.

SUMMARY OF THE INVENTION

According to the present invention there is provided an improved rotary blade cutterbar of the type including a plurality of cutting units having pinion gears driven through a train of meshed idler gears, and more particularly there is provided improved hubs for mounting the idler gears.

An object of the invention is to provide a rotary blade cutterbar having idler gears with supporting hubs that are relatively light weight while being capable of dampening gear vibrations.

Another object of the invention is to provide idler gear supporting hubs, as set forth in the previous object, which are lower in cost than current idler gear supporting hubs yet strong enough to withstand high shear loads.

A specific object of the invention is to provide idler gear supporting hubs, as set forth in the previous objects, wherein the hubs are constructed of a molded plastic material.

Still a more specific object of the invention is to provide idler gear supporting hubs as set forth in the immediately preceding object wherein the hubs are each strengthened by a metal insert.

These and other objects of the invention will be apparent from a reading of the ensuing description together with the appended drawings.

DESCRIPTION OF THE PREFERRED EMBODIMENT

Preliminarily, it should be noted that terms used herein such as "right", "left", "forward", "front", "rearward" and "rear" are with reference to an observer standing behind the structure and facing in the normal direction of forward movement of the structure during its operation.

Figure 1:
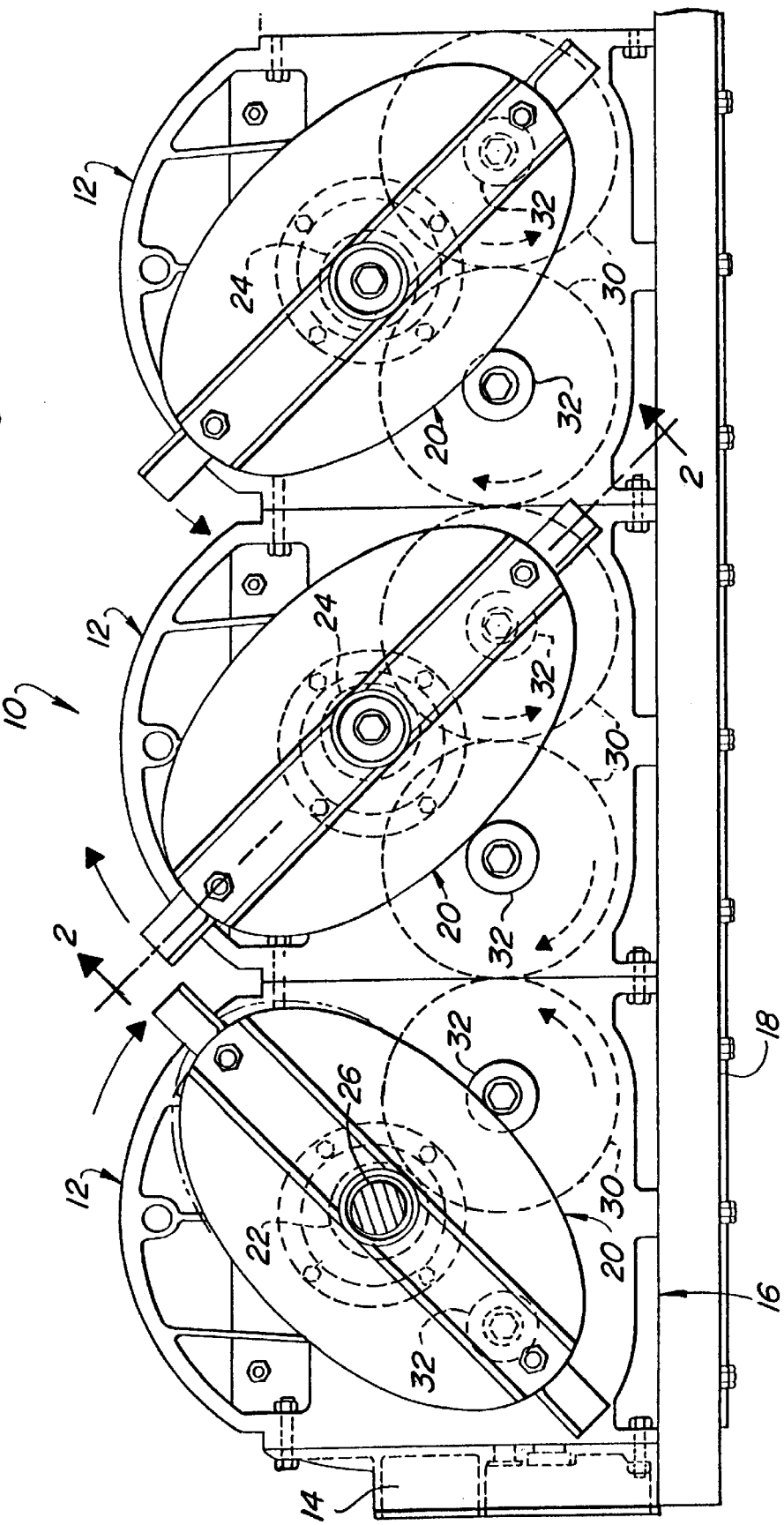
FIG. 1 is a top plan view of a portion of a cutterbar of the type with which the present invention is particularly adapted for use.

Referring now to FIG. 1, there is shown a left end segment of a rotary or disc mower cutterbar 10 constructed of a plurality of interconnected hollow housing modules 12 which cooperate with each other and with left and right end caps (only left end cap 14 being shown) to form a fluid tight gear housing 16. A stiffener beam 18 is secured across a rear side of the housing 16. Each of the modules 12 has a rotary cutting unit 20 mounted to a central location thereof for being driven by a series-parallel spur gear drive train, with the left-most housing module 12 containing a power input pinion gear 22 and with the remaining modules 12 each containing a pinion gear 24

Figure 2:
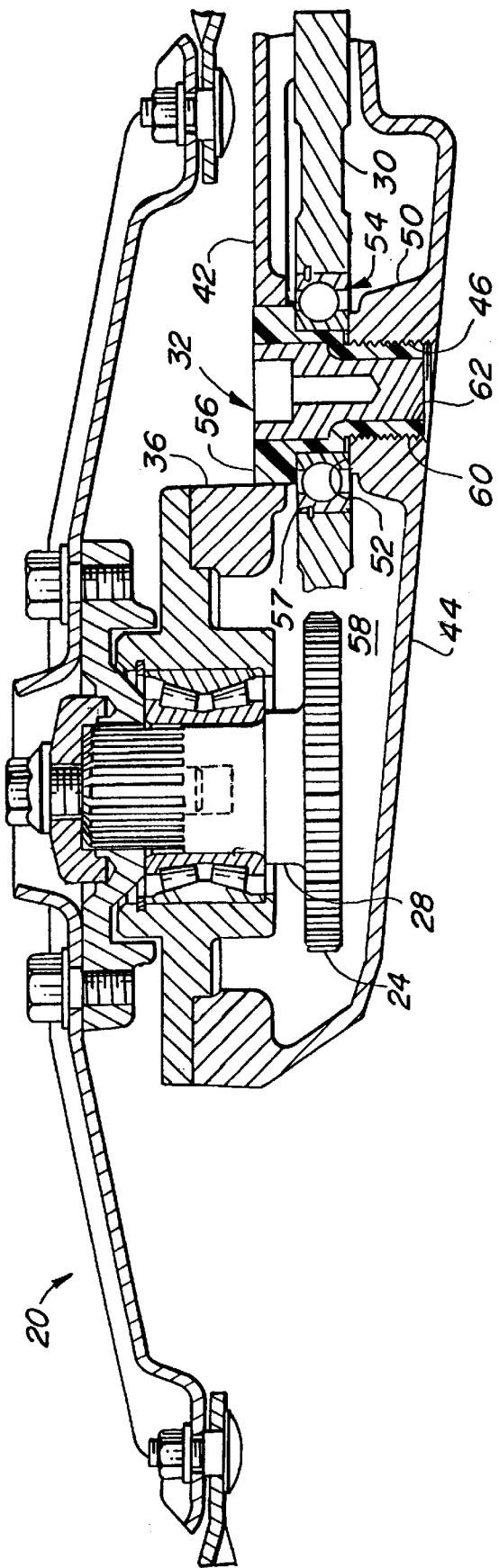
FIG. 2 is an enlarged vertical sectional view taken at 2—2 of FIG. 1.

The cutterbar 10 is powered, for example, from a power take-off of, or fluid motor coupled to the hydraulic system of, a prime mover (not shown), the power entering the cutterbar 10 by way of an input power drive shaft 26 integral with and projecting upwardly from the power input pinion gear 22. Referring now also to FIG. 2, it can be seen that power is transferred from the input pinion gear 22 to the pinion gears 24, and hence, to cutting unit drive shafts 28, formed integrally with the pinion gears 24, by a plurality of intermeshed idler gears 30 extending across a rear zone of the housing 16. The gear housing modules 12 are each designed for having a pair of the idler gears 30 mounted inside, however, it is noted that only one idler gear is required for the right- and left-most modules 12 of the cutterbar 10. However, in all cases, a pair of idler gear support hubs 32 is associated with each module 12.

Figure 3:
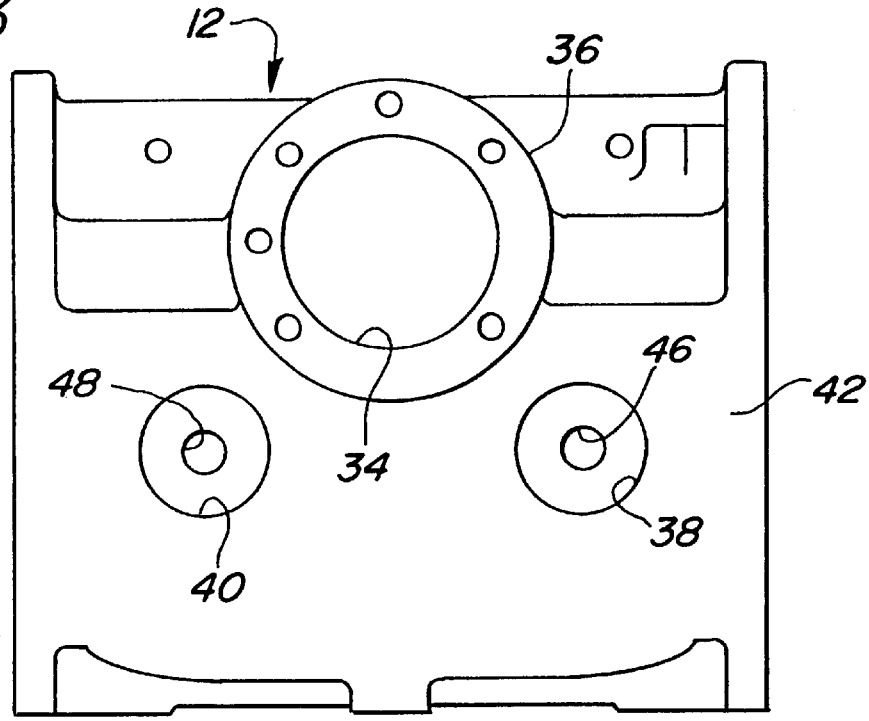
FIG. 3 is a top plan view of one of the housing sections making up the cutterbar of FIG. 1.

As can best be seen in FIG. 3, each of the housing modules 12 includes a central forward opening 34, located in an elevated central top wall portion 36, and identical right- and left-hand rear openings 38 and 40, respectively, located in a horizontal rear wall portion 42 of the module 12 and spaced equidistant from the forward opening 34 and from a longitudinal center line passing through the opening 34 and between the openings 36. Located in a bottom wall 44 of the housing module 12 respectively in axial alignment with the pair of openings 38 and 40 are right- and left-hand threaded holes 46 and 48. The holes 46 and 48 are located in respective domed areas 50 of the bottom wall 44 with a top of each area 50 defining an upwardly facing bearing seating surface 52.

Each idler gear 30 has the outer race of a ball bearing 54 tightly received in a central bore thereof and held in place by a snap ring 57 which is received in complimentary grooves located in the gear and outer bearing race. The idler gears 30 are positioned within a cavity 58 defined in part by, and located between, the top wall portion 42 and the bottom wall 44 of the selected housing module 12 with the inner race of the associated bearing 54 engaging the seating surface 52 of the associated domed area 50.

Figure 4:
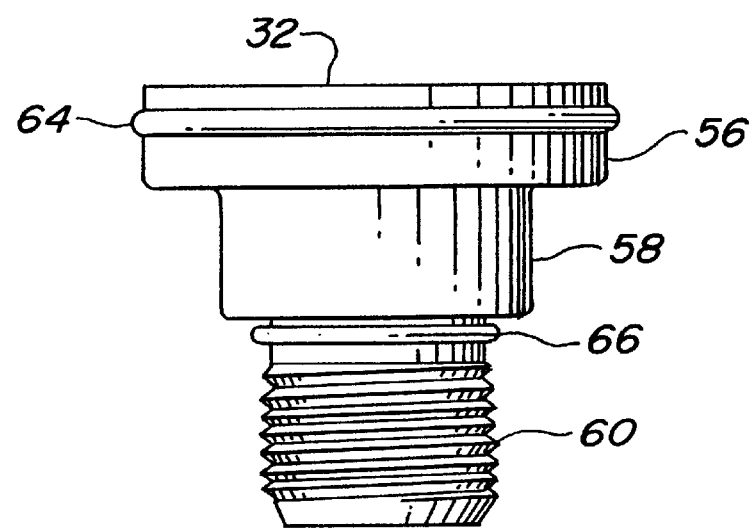
FIG. 4 is a view of the molded plastic, idler gear support hub of the present invention.
Figure 5:
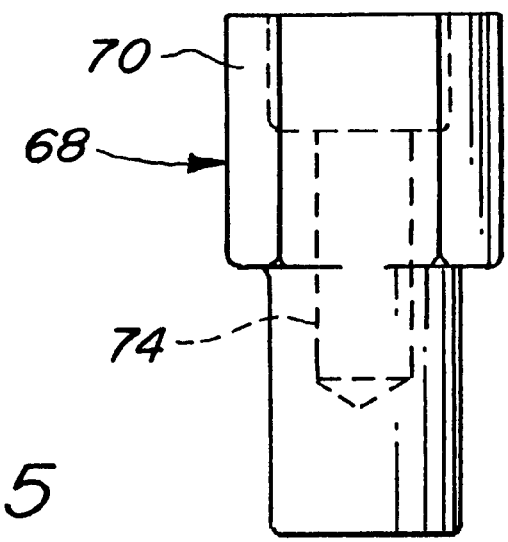
FIG. 5 is a view of the metal insert that is molded into the center of the plastic hub shown in FIG. 4.
Figure 6:
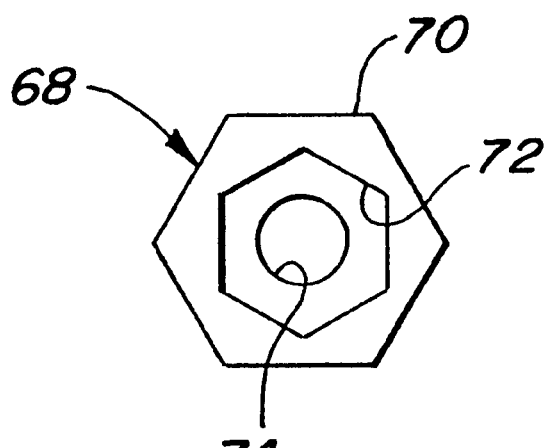
FIG. 6 is a head end view of the metal insert shown in FIG. 5.

With reference to FIG. 2 and also to FIGS. 4–6, it can be seen that the idler gear mounting hub 32 includes an enlarged upper head section 56 tightly received in the circular opening 38, a middle section 58 having a diameter less than the head section and being tightly received in the inner race of the bearing 54 and a lower end section 60 having a diameter less than that of the middle section and being threaded and screwed into the threaded hole 46. The head section 56 defines a downwardly facing surface engaged with a top surface of the inner race of the bearing 54. The hub 42 is preferably constructed so as to include an outer shell 62 (FIG. 2) molded from a polymeric plastic material. The head section 56 and the lower end section 60 are respectively provided with annular grooves receiving respective o-ring seals 64 and 66 for preventing the leakage of gear train lubricant and for excluding dust from the cavity 58. Obviously, the hub 32 could be molded so as to include integral annular ribs for forming seals instead of the o-ring grooves and o-rings 64 and 66.

Molded as an integral part of the hub 32 is a metal insert 68 which is located within and along the central axis of the plastic shell 62. The insert 68 has a length commensurate with that of the shell 62 and is provided for adding shear strength to the hub, although in some conditions a solid plastic hub would have the required strength for satisfactory operation. The insert 68 has an enlarged head-like upper end section 70 provided with a hexagonal exterior, which maintains good physical retention of the insert in the plastic shell 62, and a hexagonal interior surface forming a socket 72 which may be engaged by a wrench to aid in installing and removing the hub 70. A blind bore 74 extends axially in the insert 68 and serves during the molding process to hold the insert in a desired position on a pin located in the mold.

When a cutterbar 10 equipped with a plurality of the hubs 32 is working in the field, the low modulus plastic shells 62 of the hubs 70 will in be the path of the transmitted vibrations from the gear tooth engagement of the input pinion gear 22 and pinion gears 24 with the idler gears 30 to the housing made up of the modules 12, which makes up the major portion of the mass of the cutterbar. Thus, these vibrations will be dampened with the result that noise transmission will be lessened. Also, in the event that the cutting blades or other exterior elements of one or more of the cutting units 20 should come into contact with an obstacle, the low modulus plastic material of shells 62 of the hubs 32 will deform during the shear load experienced due to the impact and will lengthen the time of deceleration of the rotating mass so as to reduce the magnitude of the impact force, thereby reducing the incidences of failure. The metal insert 68 increases the shear strength of the associated hub 32.

Also, it is to be noted that because the hubs 32 are partially composed of plastic, the weight of the cutterbar 10 is reduced which reduces the moment of inertia of the cutterbar so as to reduce the vertical movement of the cutterbar and its suspension during operation, thereby improving the cutting performance of the implement. Furthermore, due to the hubs 32 being suited to high volume molding operations, a cost reduction is realized.

What is claimed is:

1. In a rotary mower cutterbar including a gear housing having spaced apart top and bottom walls respectively provided with a plurality of sets of axially aligned, upper and lower openings, a gear train located between said top and bottom walls and including a plurality of idler gears with each idler gear being located in axial alignment with an associated set of said upper and lower openings, an idler gear support hub supporting each of said idler gears and including upper, intermediate and bottom sections with the upper section being tightly received in said associated upper opening, with the associated idler gear being rotatably mounted said intermediate section being and with the lower section being tightly received in said associated lower opening, the improvement comprising: said hub having at least an exterior shell formed of plastic of a thickness sufficient for dampening vibrations generated by gear tooth engagement while isolating the vibration from the remainder of the cutterbar, thereby reducing the transmission of noise, and for dampening impact loads imposed on said gear train for reducing the magnitude of the impact force, thereby lessening the incidences of failures.

2. The rotary mower cutterbar defined in claim 1 wherein said hub includes a metal insert encased in said plastic shell such as to increase the shear strength of the hub.

3. The rotary mower cutterbar defined in claim 2 wherein said metal insert has a non-circular cross section to assist in maintaining good physical retention of the metal insert within the plastic shell.

4. The rotary mower cutterbar defined in claim 1 wherein said upper section of said hub is larger in diameter than said intermediate section; said metal insert has an enlarged upper end located within the enlarged upper section of the associated hub; and said enlarged upper end of said metal insert being non-circular in cross section to assist in maintaining good physical retention of the metal insert within the plastic shell.

5. The rotary mower cutterbar defined in claim 4 wherein said enlarged upper end of said metal insert is hexagonal is cross section.

6. The rotary mower cutterbar defined in claim 1 wherein the associated lower opening is a threaded hole; said lower section of said hub is threaded; and said insert has an upper end provided with a multi-faceted socket whereby a standard wrench may be used to engage said socket and screw said hub into said threaded hole in the bottom wall of the gear housing.

7. The rotary mower cutterbar defined in claim 2 wherein said insert includes an axially extendng blind bore open to a top surface of said hub which is provided for the purpose of receiving a pin for positioning said insert in a mold operable for encasing said insert in said plastic shell.

8. The rotary mower cutterbar defined in claim 1 wherein said insert has a length substantially equal to that of said shell.

9. A hub adapted for rotatably supporting a gear in a gear housing between top and bottom metal walls, comprising: a top and bottom sections respectively adapted for fitting tightly into a pair of axially aligned openings respectively provided in the top and bottom metal walls; and at least an exterior shell formed of plastic of a thickness sufficient for dampening vibrations generated by gear tooth engagement thereby isolating the vibration from the top and bottom walls so as to reduce the transmission of noise and for dampening impact loads imposed on the supported gear for reducing the magnitude of the impact force and, hence, the incidences of failures.

10. The hub defined in claim 9 wherein a metal insert is encased in said plastic shell such as to increase the shear strength of the hub.

11. The hub defined in claim 10 wherein said metal insert has a non-circular cross section to assist in maintaining good physical retention of the metal insert within the plastic shell.

12. The hub defined in claim 9 wherein said top section is larger in diameter than an intermediate section; and said metal insert having an enlarged upper end located within the top section; and said enlarged upper end of said metal insert being non-circular in cross section to assist in maintaining good physical retention of the metal insert within the plastic shell.

13. The hub defined in claim 12 wherein said enlarged upper end of said metal insert is hexagonal is cross section.

14. The hub defined in claim 9 wherein said bottom section is threaded and adapted for being installed in an associated lower opening when the latter is threaded; and said insert has an upper end provided with a multi-faceted socket whereby a standard wrench may be used to engage said socket and screw said hub into said threaded hole in the bottom wall of the gear housing.

15. The hub defined in claim 9 wherein said insert includes an axially extending blind bore open to a top surface of said hub which is provided for the purpose of receiving a pin for positioning said insert in a mold operable for encasing said insert in said plastic shell.

16. The hub defined in claim 9 wherein said insert has a length substantially equal to that of said shell.

* * * * *